(12) United States Patent

Nigon et al.

(10) Patent No.: US 12,696,828 B2

(45) Date of Patent: Aug. 4, 2026

(54) SKID SHOE FOR AN AGRICULTURAL HEADER

(71) Applicant: MACDON INDUSTRIES LTD., Winnipeg (CA)

(72) Inventors: Cyrus Nigon, Deforest, WI (US); Reid Christ, Evansville, WI (US); Karl Bernard Hundt, Lake Mills, WI (US)

(73) Assignee: MACDON INDUSTRIES LTD., Winnipeg (CA)

( * ) Notice: Subject to any disclaimer, the term of this patent is extended or adjusted under 35 U.S.C. 154(b) by 463 days.

(21) Appl. No.: 18/223,071

(22) Filed: Jul. 18, 2023

(65) Prior Publication Data

US 2025/0024767 A1 Jan. 23, 2025

(51) Int. Cl.
A01B 63/00 (2006.01)
A01B 76/00 (2006.01)

(52) U.S. Cl.
CPC ............ A01B 63/002 (2013.01); A01B 76/00 (2013.01)

(58) Field of Classification Search
CPC .............................. A01B 63/002; A01B 76/00
See application file for complete search history.

(56) References Cited

U.S. PATENT DOCUMENTS

| | | | | |
|---|---|---|---|---|
| 3,913,306 A | * | 10/1975 | Schumacher, II | ..... A01D 34/22 |
| | | | | 56/313 |
| 3,925,971 A | * | 12/1975 | Goering | ............... A01D 89/004 |
| | | | | 56/15.8 |
| 4,156,338 A | * | 5/1979 | Hengen | ................ A01D 45/021 |
| | | | | 56/106 |
| 4,353,201 A | * | 10/1982 | Pierce | .................... A01D 57/08 |
| | | | | 56/130 |
| 4,835,954 A | * | 6/1989 | Enzmann | ............... A01D 41/14 |
| | | | | 56/314 |
| 5,174,101 A | * | 12/1992 | Rabitsch | ................ A01D 41/14 |
| | | | | 56/119 |
| D382,570 S | * | 8/1997 | Bruns | ............................ D15/28 |
| D391,582 S | * | 3/1998 | Bruns | ............................ D15/28 |
| 5,924,270 A | * | 7/1999 | Bruns | .................... A01D 75/20 |
| | | | | 56/320.1 |
| D423,522 S | * | 4/2000 | Huntimer | ....................... D15/28 |
| 8,479,483 B1 | * | 7/2013 | Huseman | ............... A01D 41/14 |
| | | | | 56/181 |
| 8,806,846 B2 | * | 8/2014 | Hyronimus | .......... A01D 75/187 |
| | | | | 56/314 |
| 9,095,093 B2 | * | 8/2015 | Hyronimus | ........ A01D 34/8355 |

(Continued)

FOREIGN PATENT DOCUMENTS

| | | | | |
|---|---|---|---|---|
| CA | 2639359 A1 | * | 2/2010 | |
| CA | 3042414 A1 | * | 4/2020 | ........... A01D 41/141 |

(Continued)

*Primary Examiner* — Claude J Brown

(74) *Attorney, Agent, or Firm* — Miller Canfield

(57) ABSTRACT

A skid shoe for use with a header for harvesting row crops, in particular corn, comprises a body having a curvilinear side profile including: a central section having a first side wall, a second side wall, and a bottom surface that is convexly curved in a transverse direction bowing outwardly between the first side wall and the second side wall; a front section having a front external surface that extends forwardly and upwardly from the central section; and a rear section having a rear external surface that extends rearwardly and upwardly from the central section.

33 Claims, 10 Drawing Sheets

(56) References Cited

U.S. PATENT DOCUMENTS

| | | | | |
|---|---|---|---|---|
| 9,271,443 B2 * | 3/2016 | Sethi | .................. | A01D 57/00 |
| 9,538,709 B2 * | 1/2017 | Bassett | .............. | A01D 89/002 |
| 2015/0201544 A1 * | 7/2015 | Wick | .................. | A01B 39/22 |
| | | | | 172/681 |
| 2016/0014963 A1 * | 1/2016 | Totten | ................ | A01D 43/107 |
| | | | | 56/208 |
| 2020/0352093 A1 * | 11/2020 | Fay, II | ................ | A01D 34/28 |
| 2023/0013518 A1 * | 1/2023 | Blank | .................. | A01D 41/14 |

FOREIGN PATENT DOCUMENTS

| | | | | | |
|---|---|---|---|---|---|
| CA | 3095116 | A1 * | 4/2021 | ........... | A01D 67/00 |
| EP | 0120531 | A2 * | 10/1984 | ........... | A01D 41/14 |
| EP | 1716738 | A1 * | 11/2006 | .......... | A01D 41/141 |
| EP | 2111741 | A1 * | 10/2009 | ........... | A01D 41/14 |
| EP | 2984921 | A1 * | 2/2016 | .......... | A01D 89/003 |
| WO | WO-0149558 | A1 * | 7/2001 | ............. | B60G 7/00 |

* cited by examiner

SKID SHOE FOR AN AGRICULTURAL HEADER

BACKGROUND OF THE INVENTION

1. Field of the Invention

The present invention relates to a skid shoe for use with an agricultural machine, and more particularly, to a skid shoe for use with a row crop header.

2. Description of Related Art

Skid shoes are known to be used with agricultural machines. There are two general types of skid shoes that are used on agricultural machines. The first type of skid shoe is mounted to the agricultural machine such that it does not maintain constant engagement with the ground, but rather protects the agricultural machine from impact when traversing uneven or harsh terrain. For example, this type of skid shoe maintains a clearance above the ground during operation over uneven terrain to prevent the header from forcefully impacting the ground. The second type of skid shoe is mounted to the agricultural machine so that it does maintain constant engagement with the ground during operation to maintain a clearance or preset height of a cutterbar, for example. For both types, it is known to use skid shoes that have flat exterior bottom surfaces with longitudinal edges. The flat bottom and longitudinal edge configuration is problematic, because it can dig into the ground, push loose soil and crop residue, and requires frequent replacement due to wear. Therefore, there is a need for a skid shoe that avoids digging into the ground, minimizes pushing loose soil and crop residue, and that has sufficient durability to avoid wearing excessively due to contact with the ground.

SUMMARY OF THE INVENTION

A skid shoe for a row crop header comprises an elongated body having a generally curvilinear longitudinal side profile that includes a central section, a front section, and a rear section. The central section has a first side wall, a second side wall, and a bottom surface that is convexly curved in a transverse direction bowing outwardly between said first side wall and said second side wall. The front section has a front external surface that extends outwardly and curvilinearly upwardly in a forward longitudinal direction from the central section. The rear section has a rear external surface that extends outwardly and curvilinearly upwardly in a rearward longitudinal direction from the central section.

According to another aspect of the invention, a skid shoe for a row crop header comprises an elongated body having a generally curvilinear longitudinal side profile that includes a central section, a front section, and a rear section. The central section has a flat bottom section. The flat bottom section extends outwardly and curvilinearly upwardly in a first transverse direction defining a first outwardly bowing side wall. The flat bottom section extends outwardly and curvilinearly upwardly in a second transverse direction defining a second outwardly bowing side wall. The central section transverse lower surface is curvilinear and includes the first outwardly bowing side wall, the flat bottom section, and the second outwardly bowing side wall. The elongated body of the skid shoe further includes a front section that has a front external surface that extends outwardly and curvilinearly upwardly in a forward longitudinal direction from said central section. The elongated body of the skid shoe further includes a rear external surface that extends outwardly and curvilinearly upwardly in a rearward longitudinal direction from the central section.

According to another aspect of the invention, a header assembly for harvesting row crops comprises a header and a skid shoe that is attached to the header. The skid shoe has an elongated body having a curvilinear longitudinal side profile. The elongated body includes a central section having a first side wall, a second side wall, and a bottom surface that is convexly curved in a transverse direction bowing outwardly between the first side wall and the second side wall. The elongated body of the skid shoe further comprises a front section having a front external surface that extends outwardly and curvilinearly upwardly in a forward longitudinal direction from the central section. The elongated body of the skid shoe further comprises a rear section having a rear external surface that extends outwardly and curvilinearly upwardly in a rearward longitudinal direction from the central section.

According to yet another aspect of the invention, a header assembly for harvesting row crops comprises a header and a skid shoe that is attached to the header. The skid shoe has an elongated body having a curvilinear side profile. The elongated body includes a central section having a flat bottom section. The flat bottom section extends outwardly and curvilinearly upwardly in a first transverse direction defining a first outwardly bowing side wall. The flat bottom section extends outwardly and curvilinearly upwardly in a second transverse direction defining a second outwardly bowing side wall. The central section transverse lower surface is curvilinear and includes the first outwardly bowing side wall, the flat bottom section, and the second outwardly bowing side wall. The elongated body further comprises a front section having a front external surface that extends outwardly and curvilinearly upwardly in a forward longitudinal direction from the central section. The elongated body also further comprises a rear section having a rear external surface that extends outwardly and curvilinearly upwardly in a rearward longitudinal direction from the central section.

BRIEF DESCRIPTION OF THE DRAWINGS

Advantages of the present disclosure will be readily appreciated as the same becomes better understood by reference to the following detailed description when considered in connection with the accompanying drawings wherein.

DETAILED DESCRIPTION OF THE EMBODIMENTS

Referring to the Figures, wherein like numerals indicate like or corresponding parts throughout the several views, a skid shoe for use with a header for harvesting row crops, for example corn, is shown generally at 10.

Figure 1:
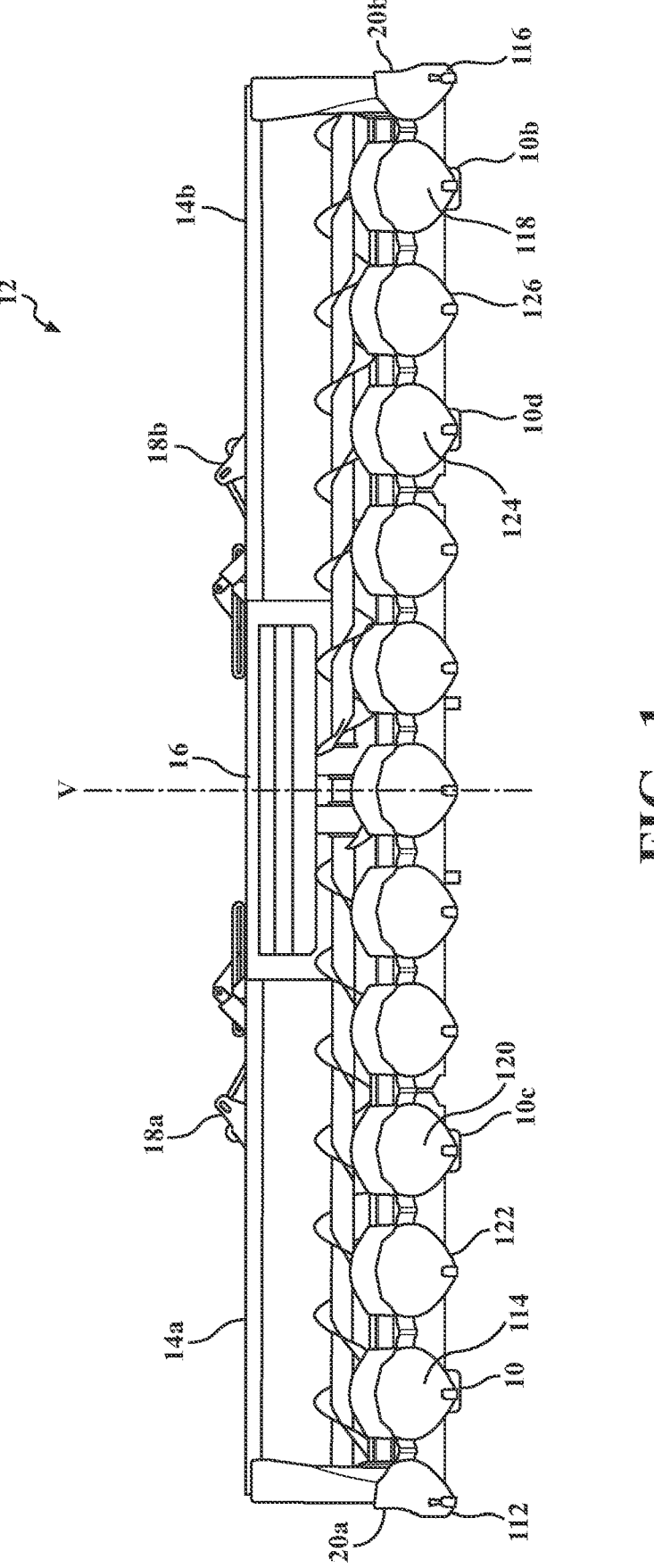
FIG. 1 is a front view of a row crop header according to one embodiment of the invention.

Referring to FIG. 1, the skid shoe 10 of the present invention is used on a row crop header 12 that has a pair of side wing sections 14a, 14b that are each independently pivotal about a center section 16 and that contour the surface of the field of crops to be harvested. The wing sections 14a, 14b vertically float relative to the center section 16 via a respective linkage system 18a, 18b. There is a skid shoe 10 mounted to the header 12 at the distal end 20a, 20b of each wing section 14a, 14b that remains in contact with the ground to maintain a cut height of the header 12 during operation. As a result of the pivotal motion of each side wing section 14a, 14b, there are times when a side wing section 14a, 14b is not parallel with the ground.

Figure 2:
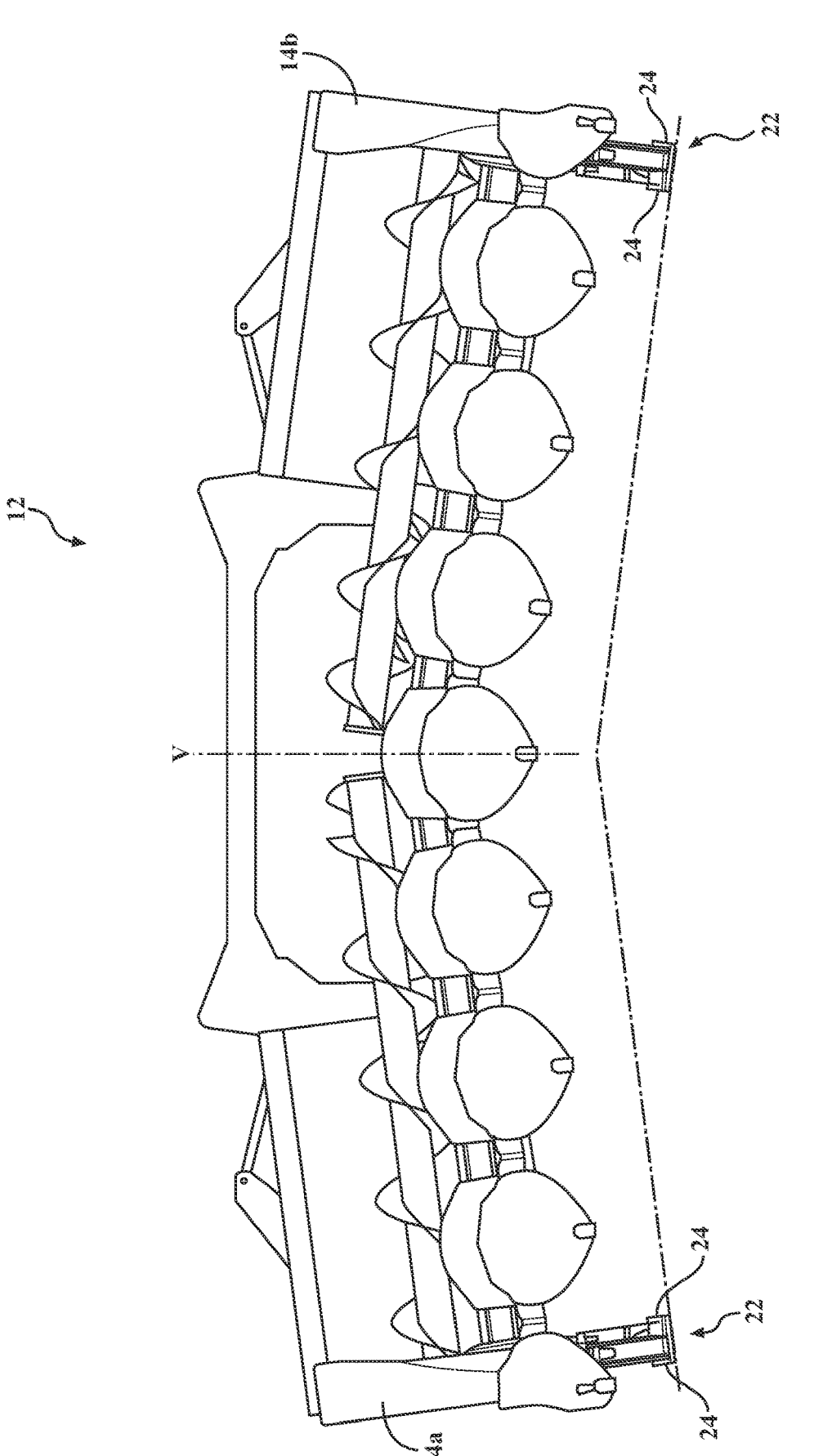
FIG. 2 is a front view of a row crop header with side wing sections pivoting downwardly with respect to a center of the header and with known skid shoes attached.
Figure 3:
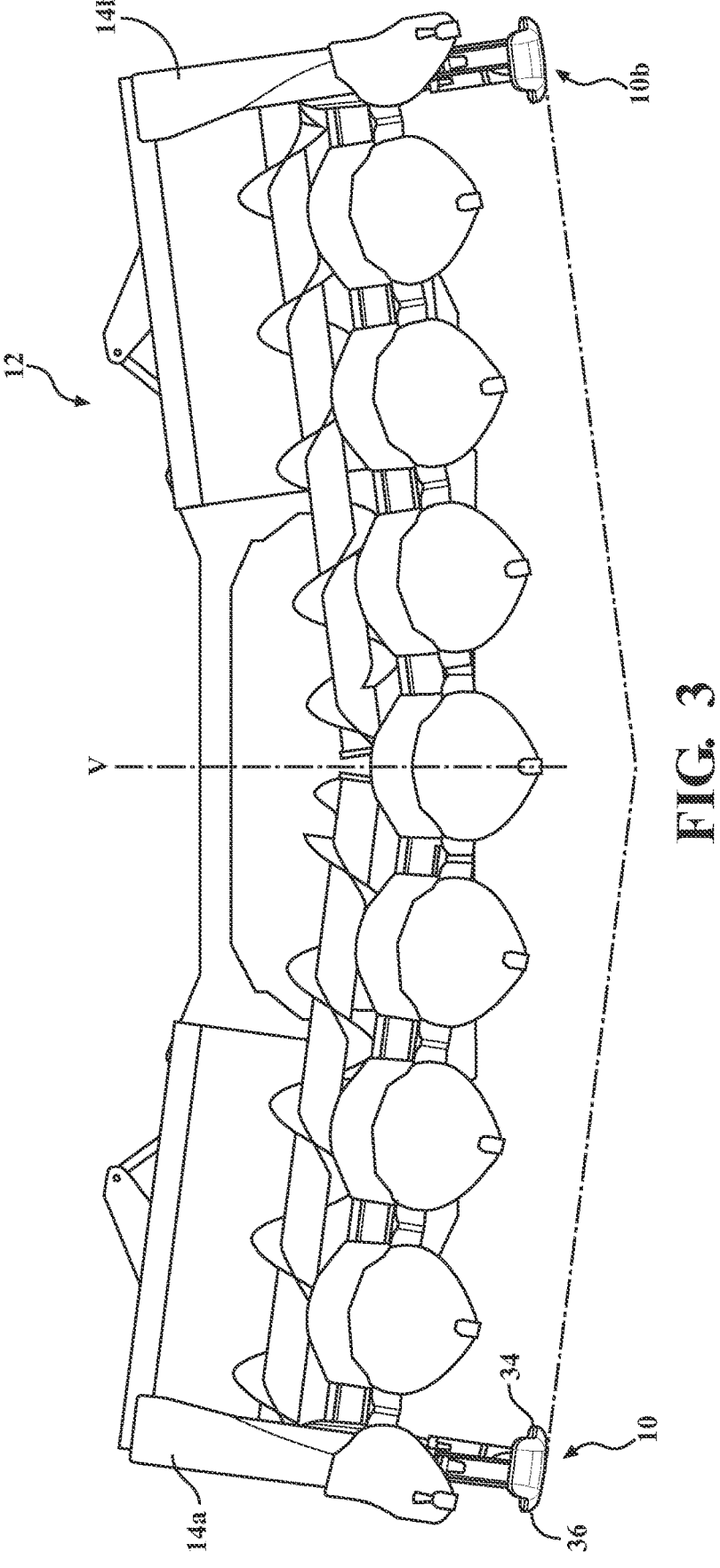
FIG. 3 is a front view of a row crop header with the side wing sections pivoting upwardly with respect to the center of the header and with two skid shoes illustrated in FIG. 4 according to one embodiment of the invention mounted to each end of the row crop header.

FIGS. 2 and 3 illustrate the row crop header 12 when the side wing sections 14a, 14b are not parallel with the ground. FIG. 2 illustrates the side wing sections 14a, 14b pivoting downwardly with respect to the center section 16. FIG. 3 illustrates the side wing sections 14a, 14b pivoting upwardly with respect to the center section 16. FIG. 2 illustrates known skid shoes 22, having angular exterior longitudinal edges 24 along a flat bottom surface, mounted to the end of each wing section 14a, 14b. Since the skid shoes 22 remain in constant contact with the ground during operation, the angular exterior longitudinal edges 24 along the flat bottom surface of each skid shoe 22 dig into the ground when the wing section 14a, 14b, to which it is attached, is positioned at an angle that is not parallel with the ground. FIG. 3 illustrates two skid shoes 10, 10b of the present invention, one mounted at the end of each side wing section 14a, 14b.

Figures 4, 5:
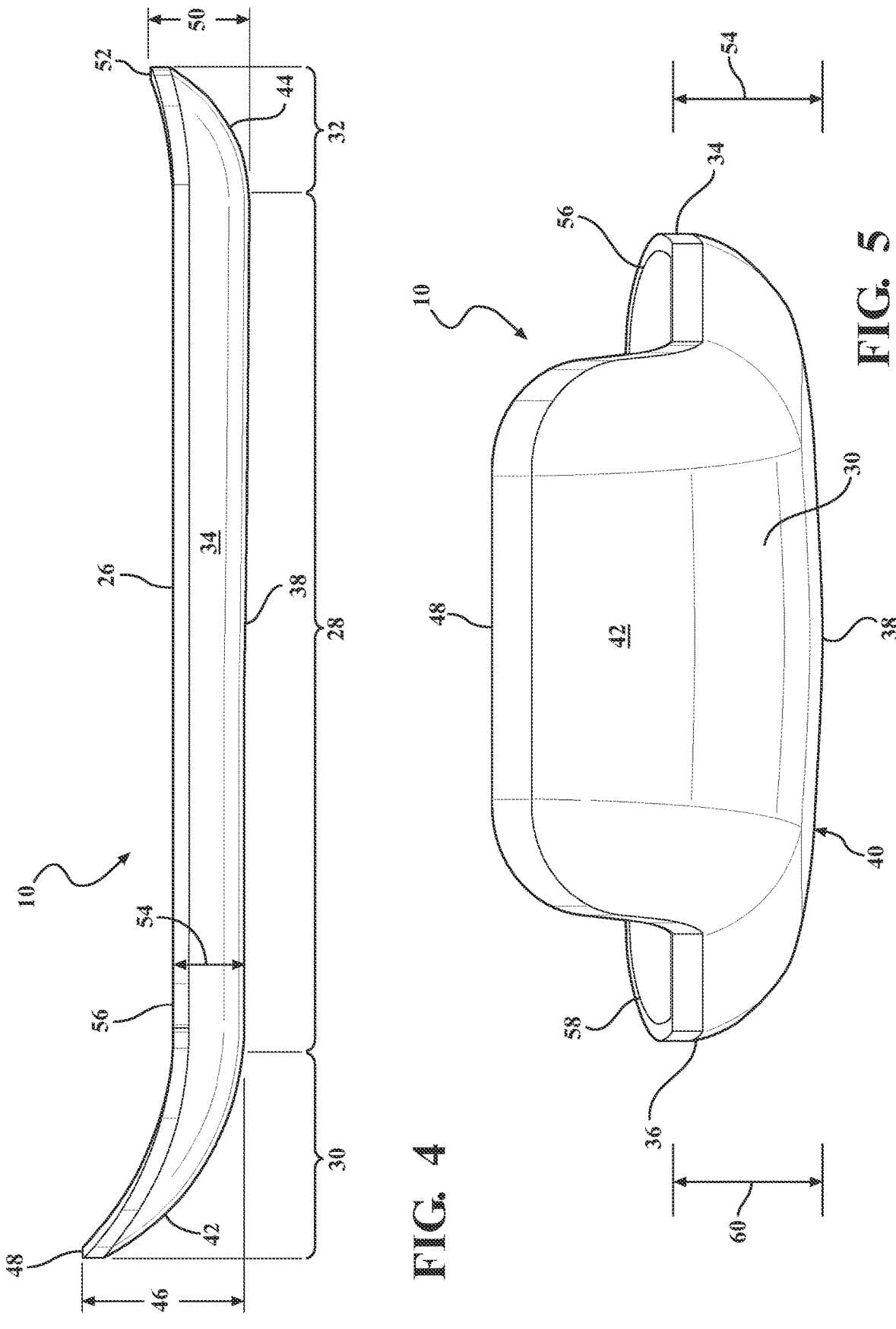
FIG. 4 is a side view of a skid shoe for a row crop header according to one embodiment of the invention.
FIG. 5 is a front view of the skid shoe illustrated in FIG. 4.

The skid shoe 10 of the present invention eliminates the angular exterior longitudinal edges along the flat bottom surface. Referring to FIGS. 4 and 5, the skid shoe 10 has an elongated body 26 having a generally curvilinear, or canoe-shaped, longitudinal side profile and includes a central section 28 extending longitudinally between a front section 30, and a rear section 32. Referring to FIGS. 4 and 5, in one embodiment, the central section 28 has a first side wall 34, a second side wall 36, and a bottom surface 38 that is continuously convexly curved in a transverse direction and bows outwardly between the first side wall 34 and the second side wall 36. The first side wall 34 curvilinearly bows outwardly in a first transverse direction. The second side wall 36 curvilinearly bows outwardly in a second transverse direction. Further, referring to FIG. 5, the central section 28 has a transverse lower surface profile 40 that continuously curvilinearly bows outwardly and includes the first side wall 34, the bottom surface 38, and the second side wall 36. Referring to FIG. 4, the front section 30 has a front external surface 42 that extends outwardly and curvilinearly upwardly in a forward longitudinal direction from the central section 28. The rear section 32 has a rear external surface 44 that extends outwardly and curvilinearly upwardly in a rearward longitudinal direction from the central section 28.

The front section 30 has a front section height dimension 46, defined from the bottom surface 38 to a front upper surface 48 of the front section 30, that is greater than a rear section height dimension 50, defined from the bottom surface 38 to a rear upper surface 52 of the rear section 32. The front section height dimension 46 is in the range of 100-110 millimeters (mm). The rear section height dimension 50 is in the range of 60-70 millimeters (mm). In one embodiment, the front section height dimension 46 is 106 millimeters (mm) and the rear section height dimension 50 is 65 millimeters (mm). The first side wall 34 and the second side wall 36 each have a constant height dimension 54, 60 defined from the bottom surface 38 to upper surfaces 56, 58 of the side walls 34, 36, respectively, and extending longitudinally from the front section 30 to the rear section 32. The first side wall height dimension 54 is defined from the bottom surface 38 to the first side wall upper surface 56. The second side wall height dimension 60 is defined from the bottom surface 38 to a second side wall upper surface 58. In this embodiment, the first side wall height dimension 54 and the second side wall height dimension 60 are equal.

Figure 6:
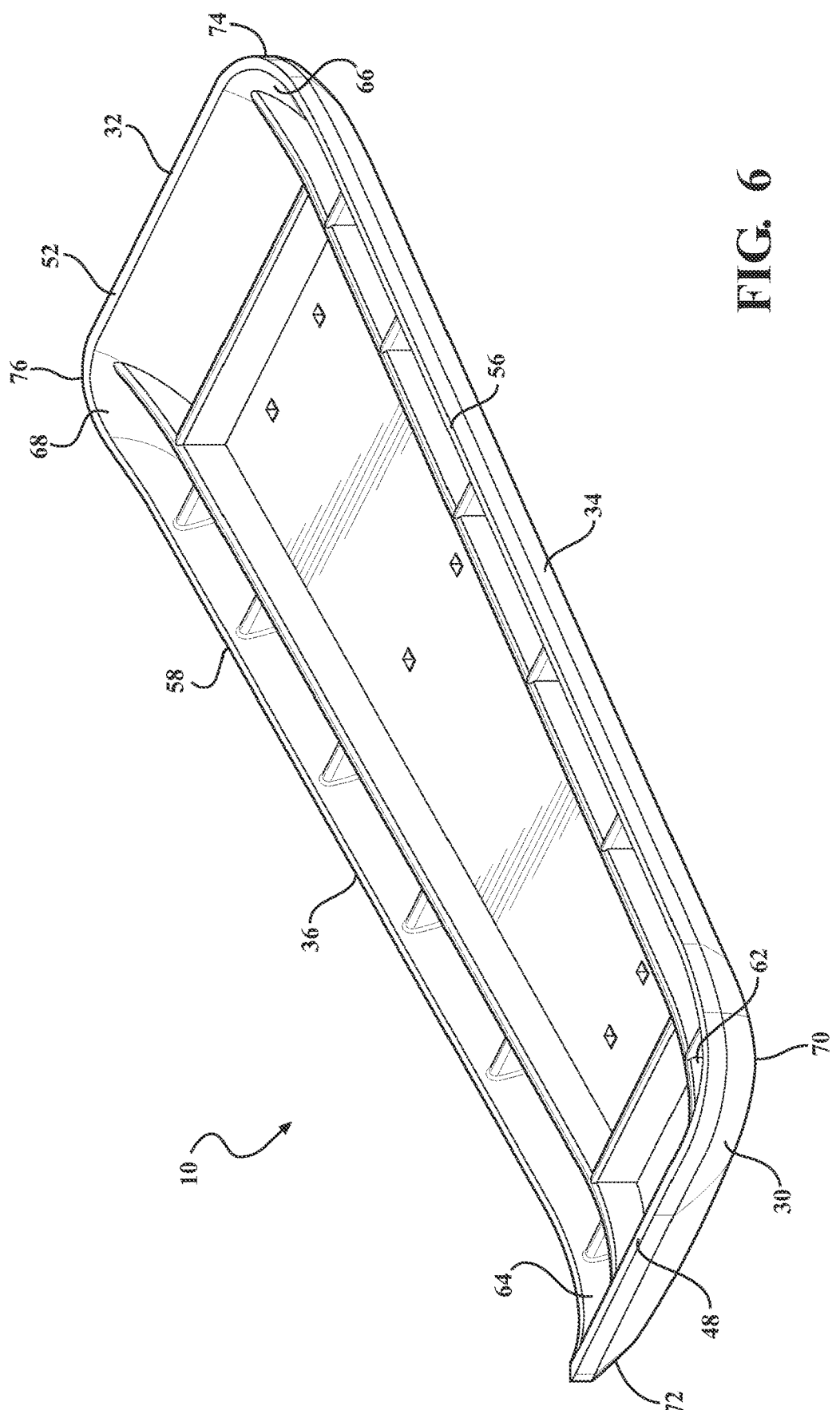
FIG. 6 is a perspective view of the skid shoe illustrated in FIG. 4.

Referring to FIG. 6, the first side wall 34 has a first side wall upper surface 56 that extends continuously from the front section 30 to the rear section 32. The second side wall 36 has a second side wall upper surface 58 that extends continuously from the front section 30 to the rear section 32. The front section 30 has a front section upper surface 48 that extends continuously from the first side wall 34 to the second side wall 36. The rear section 32 has a rear section upper surface 52 that extends continuously from the first side wall 34 to the second side wall 36. All of the top surfaces, the first side wall upper surface 56, the second side wall upper surface 58, the front section upper surface 48, and the rear section upper surface 52, form a continuous skid shoe upper surface that define an upper perimeter of the skid shoe 10.

The intersection of the first side wall 34 and the front section 30 defines an enclosed first corner 62. The intersection of the second side wall 36 and the front section 30 defines an enclosed second corner 64. The intersection of the first side wall 34 and the rear section 32 defines an enclosed third corner 66. The intersection of the second side wall 36 and the rear section 32 defines an enclosed fourth corner 68. The first enclosed corner 62 has an outwardly bowing outer surface 70. The second enclosed corner 64 has an outwardly bowing outer surface 72. The third enclosed corner 66 has an outwardly bowing outer surface 74. The fourth enclosed corner 68 has an outwardly bowing outer surface 76.

Figure 7:
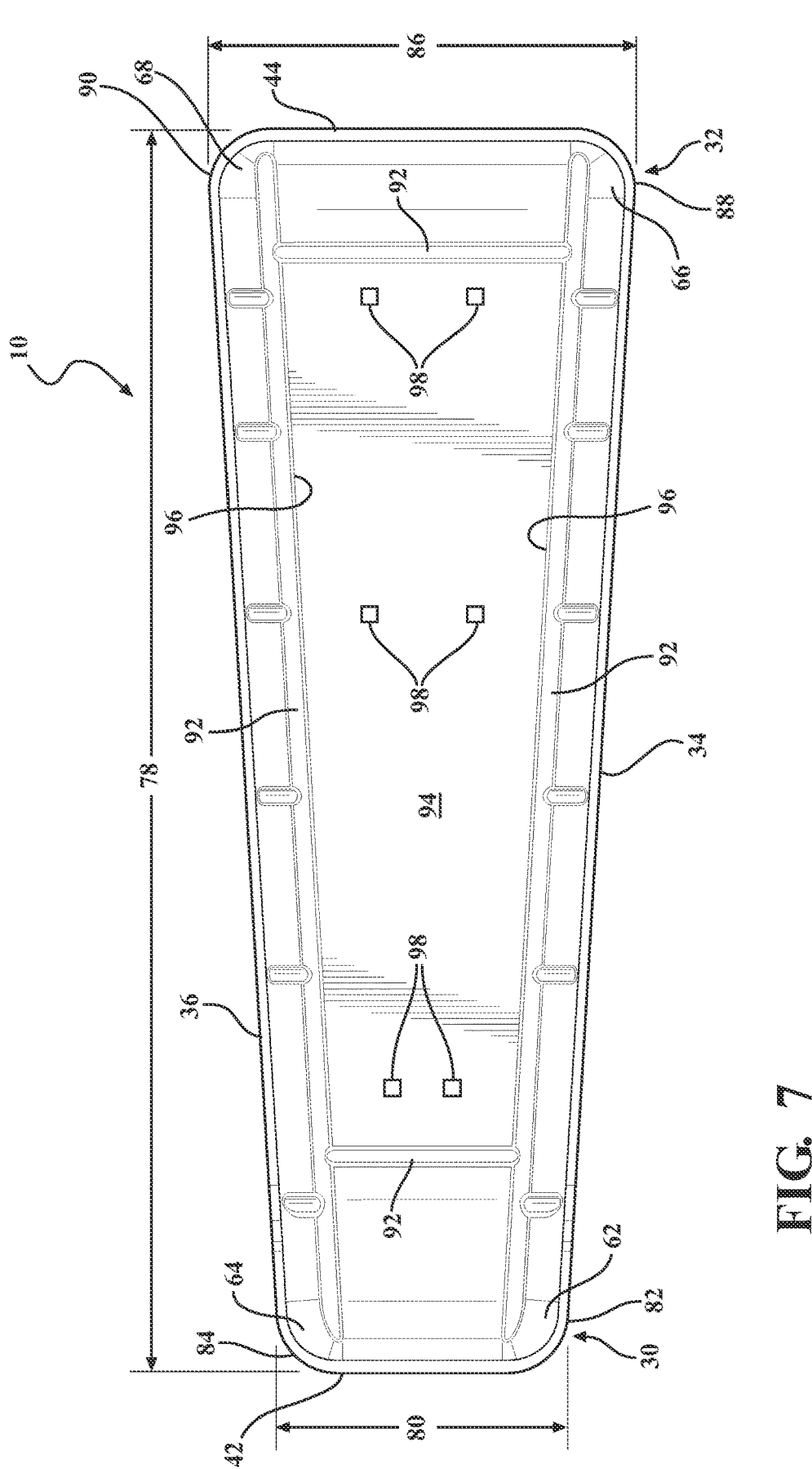
FIG. 7 is a top view of the skid shoe illustrated in FIG. 4.

Referring to FIG. 7, when viewed from above, the skid shoe 10 body has a generally trapezoidal shape continuously tapering in width between the rear section 32 and front section 30. The tapered shape helps shed material around the sides of the skid shoe 10 as it travels in the forward direction during operation. The elongated body 26 has an overall longitudinal length dimension 78, measured from a front outermost longitudinal surface of the front external surface 42 of the front section 30 to an outermost longitudinal surface of the rear external surface 44 of the rear section 32 is in the range of 785-795 mm. The front transverse width dimension 80 of the front external surface 42, measured from an outermost transverse surface 82 of the first sidewall 34 adjacent to the front section 30 to an outermost transverse surface 84 of the second sidewall 36 adjacent to the front section 30, is in the range of 180-190 mm. The rear transverse width dimension 86 of the rear external surface 44, measured from an outermost transverse surface 88 of the first sidewall 34 adjacent to the rear section 32 to an outermost transverse surface 90 of the second sidewall 36 adjacent to the rear section 32, is in the range of 260-270 mm. In one embodiment, the overall length dimension 78 is 790 mm, the front width dimension 80 is 183 mm, and the rear width dimension 86 is 262 mm.

In the illustrated embodiments, the skid shoe 10 is made from ultra-high molecular weight polyethylene (UHMW-PE). Alternatively, any material with comparable abrasion-resistance could be considered for this application.

The skid shoe 10 includes internal, structural ribs 92 on a top surface 94. The placement and orientation of the internal, structural ribs 92 define a recess 96. The recess 96 has a trapezoidal shape viewed from above, or from a top perspective.

The skid shoe 10 includes at least one mounting aperture 98 that extends through the thickness of the central section 28 from the top surface 94 through to the bottom surface 38. In the illustrated embodiment, there are six mounting apertures 98 that are each square shaped.

Figure 8:
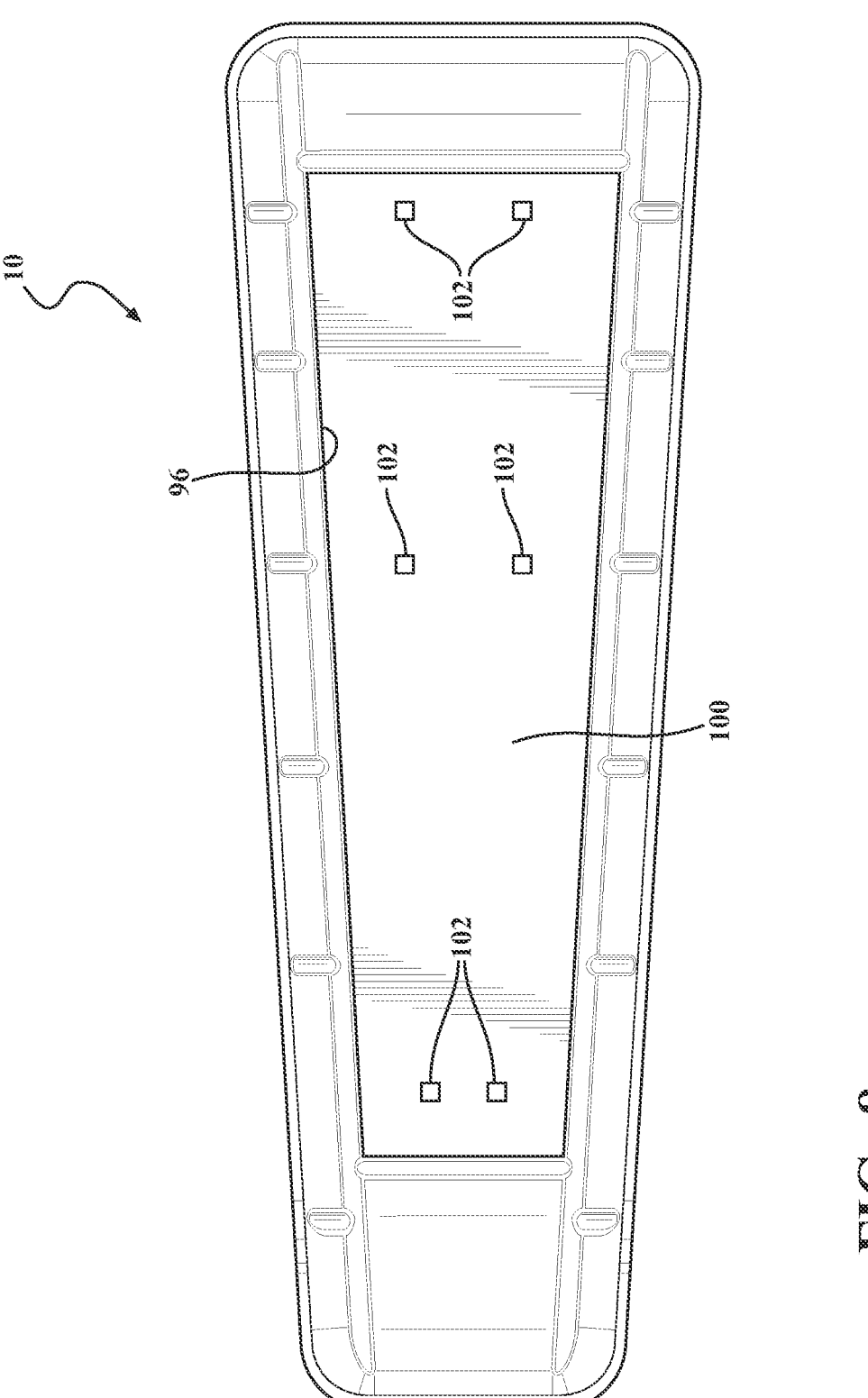
FIG. 8 is a top view of the skid shoe illustrated in FIG. 4 including a plate positioned within the recess.
Figure 9:
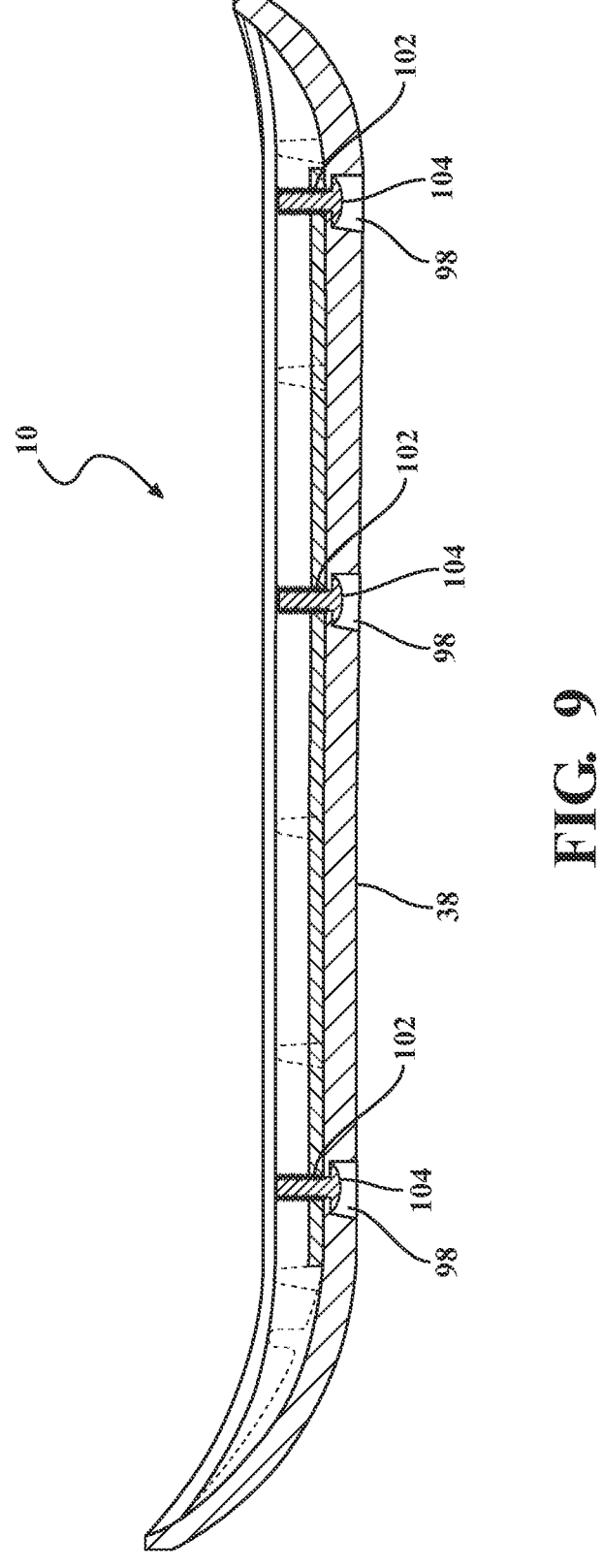
FIG. 9 is a side view of the skid shoe illustrated in FIG. 4 including a plate positioned within the recess and screws received within the plate.

Referring to FIG. 8, to mount the skid shoe 10 to the header 12, a plate 100 is positioned within the recess 96 of the skid shoe 10. The plate 100 may be made from steel and, in the illustrated embodiment, is 6 millimeters (mm) thick. The shape of the plate 100 is the same as the shape of the recess 96 and is sized to be received within the recess 96. In the illustrated embodiment, the recess 96 and the plate 100 both have a trapezoidal shape.

The plate 100 includes six mounting apertures 102 that align with the six skid shoe mounting apertures 98 when the plate is positioned within the recess 96. In the illustrated embodiment, the six apertures 98 in the skid shoe 10 and the six apertures 102 in the plate 100 are all square shaped. In each pair of aligned apertures 98, 102 a round-head, square-neck bolt 104 is inserted from the bottom of the skid shoe 10 and protrudes through the square hole 98 in the bottom 38 of the shoe 10 and through the aligned square hole 102 in the plate 100. The depth of the square neck of the bolt 104 is designed to engage with both the square aperture 98 through the skid shoe and the square aperture 102 through the plate. The placement and position of the plate 100 aids in reinforcement to minimize stripping out the bolts 104 when attaching the skid shoe 10 to the header 12.

Figures 10, 11:
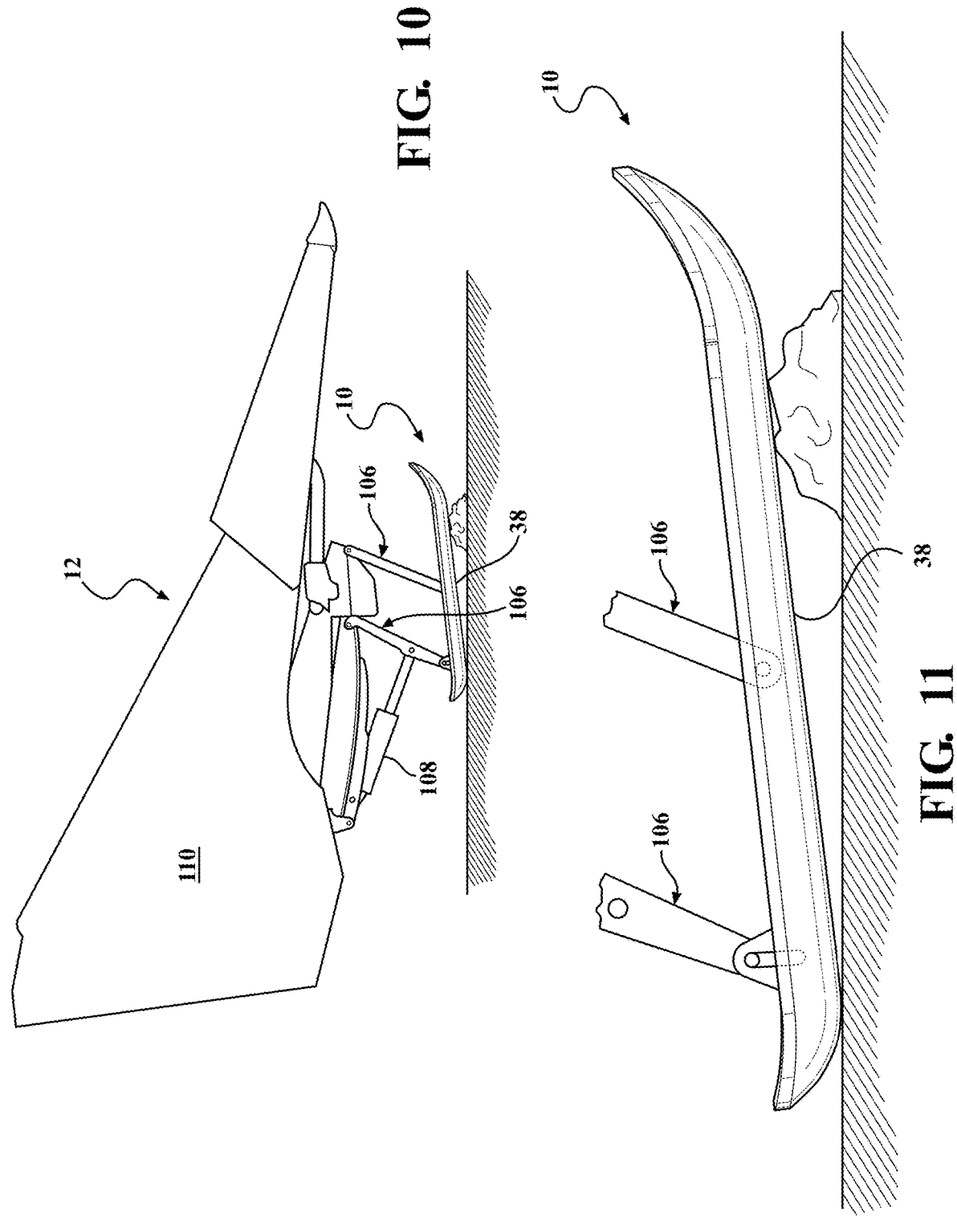
FIG. 10 is a partial side view of the skid shoe illustrated in FIG. 4 attached to a corn header.
FIG. 11 is a partial side view of the skid shoe illustrated in FIG. 10.

Referring to FIG. 1, the skid shoe 10 is attached to the outer portion 20a of the first wing section 14a. A second skid shoe 10b is attached to an outer portion 20b of the second wing section 14b. Each of these skid shoes 10, 10b are adjustably mounted to their respective wing sections 14a, 14b and can be referred to as adjustable skid shoes. Referring to FIG. 10, although only skid shoe 10 is illustrated, each of the adjustable skid shoes 10, 10b includes a welded steel linkage 106 that is attached to the steel plate 100 (not visible in FIG. 10 due to its position within recess 96) and to a hydraulic cylinder 108 that facilitates vertical adjustment of each skid shoe 10, 10b. Each hydraulic cylinder 108 is also connected to the header frame 110 and by controlling the vertical position of each skid shoe 10, 10b controls the spacing of each header wing 14a, 14b from the ground during operation.

Referring to FIG. 1, the header 12 further includes a third skid shoe 10c and a fourth skid shoe 10d that are each fixedly attached to the header 12 and are therefore referred to as non-adjustable skid shoes. The third skid shoe 10c is mounted to the first wing section 14a between the skid shoe 10 and the header center section 16. The fourth skid shoe 10d is mounted to the second wing section 14b between the second skid shoe 10b and the header center section 16.

The header 12 illustrated in FIG. 1 is a twelve (12) row header. The first skid shoe 10 is mounted to the first wing section 14a between a first row unit 112 and a second row unit 114 from a distal end 20a of the first wing section 14a. The second skid shoe 10b is mounted to the header 12 between a first row unit 116 and a second row unit 118 from a distal end 20b of the second wing section 14b. The third skid shoe 10c is mounted to the first wing section 14a between a third row unit 120 and a fourth row unit 122 from the center 16 of the header 12. The fourth skid shoe 10d is mounted to the second wing section 14b between a third row unit 124 and a fourth row unit 126 from the center 16 of the header 12. However, it should be appreciated that the header 12 may include any number of rows and with the skid shoes mount to the wing sections between the row units as desired without varying from the scope of the invention. FIG. 3 illustrates an eight (8) row header having only two adjustable skid shoes 10, 10b. Skid shoe 10 is mounted at the end of the first side wing section 14a. Skid shoe 10b is mounted at the end of the second side wing section 14b.

Figures 12, 13:
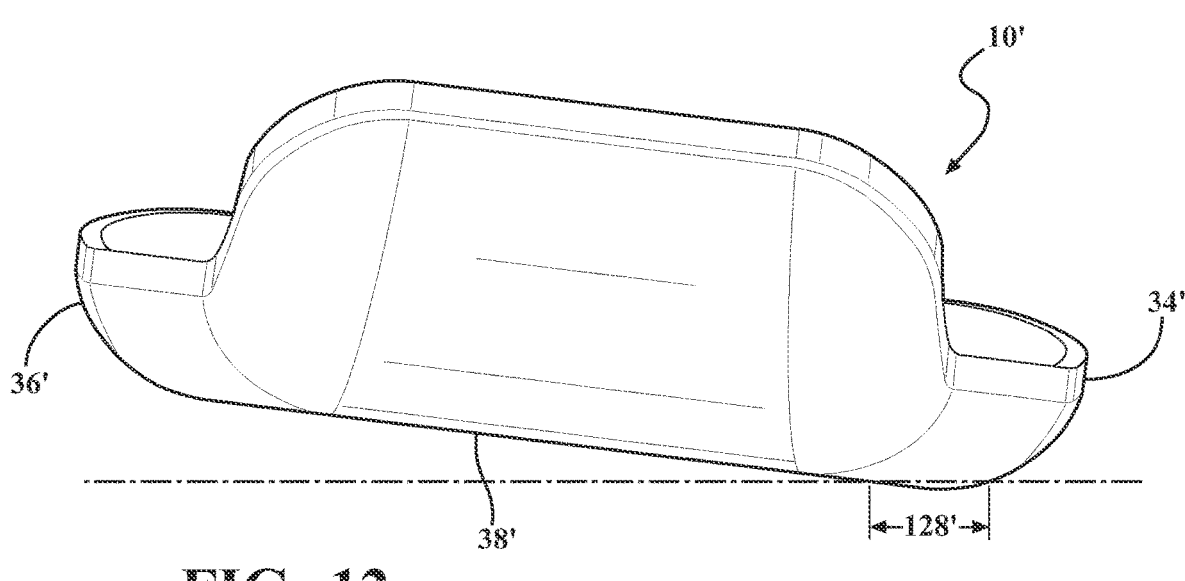
FIG. 12 is a front view of a second embodiment of the skid shoe positioned not parallel to the ground.
FIG. 13 is a front view of the skid shoe illustrated in FIG. 4 positioned not parallel to the ground.

In an alternative embodiment, illustrated in FIG. 12, the skid shoe 10' has all of the same dimensions and features as the prior skid shoe 10 embodiment with the exception that the bottom surface 38' of this alternative skid shoe 10' embodiment is flat. Either of these two skid shoe embodiments 10, 10' can be used on the header 12 as described above, either mounted to the header 12 as an adjustable skid or as a non-adjustable skid shoe. The skid shoe 10' has an elongated body having a generally curvilinear longitudinal side profile including a central section, a front section, and a rear section. However, the central section has a generally flat bottom section 38'. The flat bottom section 38' extends outwardly and curvilinearly upwardly in a first transverse direction defining a first outwardly bowing side wall 34'. The flat bottom section 38' extends outwardly and curvilinearly upwardly in a second transverse direction defining a second outwardly bowing side wall 36'. The central section has a transverse lower surface that is curvilinear and includes the first outwardly bowing side wall 34', the flat bottom section 38', and the second outwardly bowing side wall 36'. The front and rear sections of this embodiment are the same as the prior skid shoe embodiment 10 with the outwardly bowing bottom surface.

The skid shoe 10 disclosed in the first embodiment that has the convexly curved, outwardly bowing bottom surface 38 requires approximately 5% more material to manufacture than the skid shoe 10' disclosed in the second embodiment that has the flat bottom surface 38', but results in the skid shoe 10 of the first embodiment having double to triple the life span of the skid shoe 10' of the second embodiment.

Since the skid shoes that are each mounted on the ends of the first and second wing sections maintain contact with the ground during operation, there is a portion of the bottom surface that is a "contact surface" with the ground. FIG. 13 illustrates the "contact surface" 128 of the skid shoe 10 of the first embodiment engaging with the ground when not parallel with the ground, for example when the wing section 14 to which it is attached has pivoted with respect to the center section 16 due to uneven terrain or crossing over an object. Similarly, FIG. 12 illustrates the "contact surface" 128' of the skid shoe 10' of the second embodiment engaging with the ground when it is not parallel with the ground. The "contact surface" 128 shown in FIG. 13 is larger due to the outward convex curve of the bottom surface 38 compared to the "contact surface" 128' of the flat bottom 38' skid shoe 10' shown in FIG. 12. In one embodiment, the "contact surface" 128 of the outwardly bowing convex bottom surface is approximately 70 millimeters (mm) wide compared to a "contact surface" 128' of approximately 30 millimeters (mm) of the flat bottom surface 38'. The larger "contact surface" 128 results in prolonging the life of the skid shoe 10. The continuous curvilinear profiles of each skid shoe 10, 10' in both the transverse direction and the longitudinal direction, for each embodiment of the skid shoe, prevents digging and pushing of the skid shoe into the ground and also helps the skid shoe lose soil and crop residue during operation.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

The invention claimed is:

1. A skid shoe for a header for harvesting crops, comprising:
   an elongated body having a generally curvilinear longitudinal side profile, said elongated body including:
   a central section having a first side wall, a second side wall, and a bottom surface wherein said bottom surface is convexly curved in a transverse direction bowing outwardly between said first side wall and said second side wall;
   a front section having a front external surface that extends outwardly and curvilinearly upwardly in a forward longitudinal direction from said central section; and
   a rear section having a rear external surface that extends outwardly and curvilinearly upwardly in a rearward longitudinal direction from said central section;
   wherein said first side wall and said second side wall each have a constant height dimension extending from said front section to said rear section, wherein said first side wall height dimension is defined from said bottom surface to a first side wall upper surface and said second side wall height dimension is defined from said bottom surface to a second side wall upper surface;
   wherein said first side wall upper surface extends continuously from said front section to said rear section;
   wherein said second side wall upper surface extends continuously from said front section to said rear section;
   wherein a front section upper surface extends continuously from said first side wall to said second side wall; and
   wherein a rear section upper surface extends continuously from said first side wall to said second side wall.

2. The skid shoe of claim 1, wherein said first side wall curvilinearly bows outwardly in a first transverse direction, said second side wall curvilinearly bows outwardly in a second transverse direction, and wherein said central section has a transverse lower surface profile that continuously curvilinearly bows outwardly including said first side wall, said bottom surface, and said second side wall.

3. The skid shoe of claim 1, wherein said front section has a front section height dimension that is greater than a rear section height dimension, wherein said front section height dimension is defined from said bottom surface to a front upper surface, and said rear section height dimension is defined from said bottom surface to a rear upper surface.

4. The skid shoe of claim 1, wherein said first side wall height dimension and said second side wall height dimension are equal.

5. The skid shoe of claim 1, wherein said first side wall upper surface, said second side wall upper surface, said front section upper surface, and said rear section upper surface define a continuous skid shoe upper surface.

6. The skid shoe of claim 5, wherein:
   a first enclosed corner is defined by an intersection of said first side wall and said front section;
   a second enclosed corner is defined by an intersection of said second side wall and said front section;
   a third enclosed corner is defined by an intersection of said first side wall and said rear section; and
   a fourth corner is defined by an intersection of said second side wall and said rear section.

7. The skid shoe of claim 6, wherein:
   said first enclosed corner, said second enclosed corner, said third enclosed corner, and said fourth enclosed corner each has an outwardly bowing outer surface.

8. The skid shoe of claim 1, wherein said elongated body has a trapezoidal shape viewed from above.

9. The skid shoe of claim 1, wherein said skid shoe is made from ultra-high molecular weight polyethylene.

10. The skid shoe of claim 1, further comprising a rib.

11. The skid shoe of claim 10, further comprising multiple ribs defining a recess.

12. The skid shoe of claim 11, wherein said recess is trapezoidal shaped viewed from above.

13. The skid shoe of claim 1, further comprising a mounting aperture through said central section bottom surface.

14. A skid shoe for a header for harvesting crops, comprising:
   an elongated body having a generally curvilinear longitudinal side profile, said elongated body including:
   a central section having a flat bottom section, wherein the flat bottom section extends outwardly and curvilinearly upwardly in a first transverse direction defining a first outwardly bowing side wall and the flat bottom section extends outwardly and curvilinearly upwardly in a second transverse direction defining a second outwardly bowing side wall, and wherein a central section transverse lower surface is curvilinear and includes said first outwardly bowing side wall, said flat bottom section, and said second outwardly bowing side wall;
   a front section having a front external surface that extends outwardly and curvilinearly upwardly in a forward longitudinal direction from said central section; and
   a rear section having a rear external surface that extends outwardly and curvilinearly upwardly in a rearward longitudinal direction from said central section;
   wherein said first outwardly bowing side wall and said second outwardly bowing side wall each have a constant height dimension extending from said front section to said rear section, wherein said first sidewall height dimension is defined from said bottom surface to a first side wall upper surface and said second side wall height dimension is defined from said bottom surface to a second side wall upper surface;

wherein said first side wall upper surface extends continuously from said front section to said rear section;

wherein said second side wall upper surface extends continuously from said front section to said rear section;

wherein a front section upper surface extends continuously from said first outwardly bowing side wall to said second outwardly bowing side wall; and wherein a rear section upper surface extends continuously from said first outwardly bowing side wall to said outwardly bowing second side wall.

15. The skid shoe of claim 14, wherein said front section has a front section height dimension that is greater than a rear section height dimension, wherein said front section height dimension is defined from said bottom surface to a front upper surface, and said rear section height dimension is defined from said bottom surface to a rear upper surface.

16. The skid shoe of claim 14, wherein said first side wall height dimension and said second side wall height dimension are equal.

17. The skid shoe of claim 14, wherein said first side wall upper surface, said second side wall upper surface, said front section upper surface, and said rear section upper surface define a continuous skid shoe upper surface.

18. The skid shoe of claim 14, wherein:

a first enclosed corner is defined by an intersection of said first side wall and said front section;

a second enclosed corner is defined by an intersection of said second side wall and said front section;

a third enclosed corner is defined by an intersection of said first side wall and said rear section; and a fourth enclosed corner is defined by an intersection of said second side wall and said rear section.

19. The skid shoe of claim 18, wherein:

said first corner, said second corner, said third corner, and said fourth corner each has an outwardly bowing outer surface.

20. The skid shoe of claim 14, wherein said elongated body has a trapezoidal shape viewed from above.

21. The skid shoe of claim 14, wherein said skid shoe is made from ultra-high molecular weight polyethylene.

22. The skid shoe of claim 14, further comprising a rib.

23. The skid shoe of claim 22, further comprising multiple ribs defining a recess therebetween.

24. The skid shoe of claim 23, wherein said recess is trapezoidal shaped viewed from above.

25. The skid shoe of claim 14, further comprising a mounting aperture through the central section bottom surface.

26. A header assembly for harvesting row crops comprising:

a header;

a skid shoe attached to said header, wherein said skid shoe has an elongated body having a curvilinear side profile along a continuous longitudinal upper surface, said elongated body includes a central section having a first side wall, a second side wall, and a bottom surface wherein said bottom surface is convexly curved in a transverse direction bowing outwardly between said first side wall and said second side wall, said skid shoe comprising:

ribs on a top surface, said ribs defining a recess; and a mounting aperture through said bottom surface of said central section;

wherein said skid shoe first wall curvilinearly bows outwardly in a first transverse direction, said second side wall curvilinearly bows outwardly in a second transverse direction, and wherein said central section has a transverse lower surface profile that continuously curvilinearly bows outwardly including said first side wall, said bottom surface, and said second side wall;

a plate, including an aperture, positioned within said recess and wherein said plate aperture is aligned with said skid shoe mounting aperture; and a fastener received within said aligned skid shoe mounting aperture and plate aperture, wherein said fastener is attached to said header.

27. The header assembly of claim 26, wherein said skid shoe is made from ultra-high molecular weight polyethylene and said plate is made from steel.

28. The header assembly of claim 27, wherein:

said header is a row crop header comprising a center section, a first wing section pivotally attached to a first side of said center section; and a second wing section pivotally attached to a second side of said center section; and further comprising a second skid shoe, wherein said skid shoe is connected to an outer portion of said first wing section and said second skid shoe is connected to an outer portion of said second wing section.

29. The header assembly of claim 28, wherein said skid shoe is adjustably mounted to said first wing section and said second skid shoe is adjustably mounted to said second wing section.

30. The header assembly of claim 29, further comprising a linkage coupled to said plate and a second linkage coupled to a second plate for mounting the skid shoe and second skid shoe to said header; and wherein each said linkage is connected to a hydraulic cylinder, which facilitates adjustment of said connected skid shoe, and each hydraulic cylinder is connected to said header.

31. The header assembly of claim 30, further comprising a third skid shoe and a fourth skid shoe, wherein:

said third skid shoe is mounted to said first wing section between said skid shoe and said center section; and said fourth skid shoe is mounted to said second wing section between said second skid shoe and said center section.

32. The header assembly of claim 31, wherein said third skid shoe is fixedly mounted to said first wing section and said fourth skid shoe is fixedly mounted to said second wing section.

33. A header assembly for harvesting row crops comprising:

a header; and a skid shoe attached to said header, wherein said skid shoe has an elongated body having a curvilinear longitudinal side profile, said elongated body includes:

a central section having a flat bottom section, wherein the flat bottom section extends outwardly and curvilinearly upwardly in a first transverse direction defining a first outwardly bowing side wall and the flat bottom section extends outwardly and curvilinearly upwardly in a second transverse direction defining a second outwardly bowing side wall, and wherein a central section transverse lower surface is curvilinear and includes said first outwardly bowing side wall, said flat bottom section, and said second outwardly bowing side wall;

a front section having a front section upper surface and a front external surface that extends outwardly and curvilinearly upwardly in a forward longitudinal direction from said central section; and a rear section having a rear external surface that extends outwardly and curvilinearly upwardly in a rearward longitudinal direction from said central section;

wherein said front section upper surface extends continuously from said first outwardly bowing side wall to said second outwardly bowing side wall.

\* \* \* \* \*